(12) United States Patent
Want

(10) Patent No.: US 7,748,598 B2
(45) Date of Patent: Jul. 6, 2010

(54) METHOD OF JOINING CLAD METALS AND VESSEL PRODUCED THEREBY

(75) Inventor: Donald Joseph Want, Bonville (AU)

(73) Assignee: W. E. Smith Engineering Pty Ltd, New South Wales (AU)

( * ) Notice: Subject to any disclaimer, the term of this patent is extended or adjusted under 35 U.S.C. 154(b) by 163 days.

(21) Appl. No.: 11/816,829

(22) PCT Filed: Aug. 10, 2005

(86) PCT No.: PCT/AU2005/001196

§ 371 (c)(1),
(2), (4) Date: Aug. 22, 2007

(87) PCT Pub. No.: WO2006/089339

PCT Pub. Date: Aug. 31, 2006

(65) Prior Publication Data

US 2008/0268279 A1   Oct. 30, 2008

(30) Foreign Application Priority Data

Feb. 24, 2005   (AU) .............................. 2005200826
Jun. 23, 2005   (AU) .............................. 2005202741

(51) Int. Cl.
*B23K 31/02*   (2006.01)
(52) U.S. Cl. .................... 228/164; 228/262.71
(58) Field of Classification Search ................ None
See application file for complete search history.

(56) References Cited

U.S. PATENT DOCUMENTS 2,209,290 A   7/1940   Watts (Continued)

FOREIGN PATENT DOCUMENTS

FR   2470654   6/1981

(Continued)

OTHER PUBLICATIONS

Baker, "Titanium Clad Autoclave Performance in Nickel Laterite Hydrometallurgy", published on Internet at http://www.dynamicmaterials.com/data/brochures/3-Randol%20Autoclave%20Paper%205-00.pdf, last accessed Dec. 5, 2007.

*Primary Examiner*—Kiley Stoner
(74) *Attorney, Agent, or Firm*—DeLio & Peterson, LLC; Anthony P. DeLio

(57) ABSTRACT

A method for joining clad metal plates having a protective layer (27), e.g. titanium, and a substrate layer (28), e.g. carbon steel, includes firstly removing margins (29) of protective layer along edges of the clad metal plates to be joined. The substrate layers are then welded together to form an exposed substrate weld (31). Covering material (38) of the same type as the protective layer (27) is then located along the exposed substrate weld (31) to a level substantially flush with an outer surface of the protective layer (27). The substrate layer (28) is heated prior to welding the covering material so that the covering material is pre-stressed when cooled. The method may be used to fabricate reaction vessels having seams that do not stand proud of the remainder of the interior surface of the vessel. The low profile seams are less susceptible to erosion than has been the case in the past so that longer-life vessels can be produced. The invention encompasses vessels such as autoclaves, crucibles and reaction vessels formed of clad plate joined by the method.

14 Claims, 8 Drawing Sheets

U.S. PATENT DOCUMENTS

| | | |
|---|---|---|
| 3,281,930 A | 11/1966 | Fordham |
| 3,443,306 A | 5/1969 | Meyer |
| 3,457,961 A | 7/1969 | Long |
| 3,733,686 A * | 5/1973 | Maucher .................... 228/165 |
| 4,142,664 A | 3/1979 | Feige |
| 4,272,005 A | 6/1981 | Jackson |
| 4,485,960 A | 12/1984 | Sagan |
| 4,600,139 A | 7/1986 | Murase |
| 4,688,691 A | 8/1987 | Christian |
| 5,305,946 A | 4/1994 | Heilmann |
| 5,874,178 A | 2/1999 | Takayasu |
| 6,412,684 B1 | 7/2002 | Miola |
| 7,037,039 B1 * | 5/2006 | Werts .......................... 405/99 |

FOREIGN PATENT DOCUMENTS

| | | | |
|---|---|---|---|
| JP | 58168495 A * | 10/1983 | |
| JP | 62275577 | 11/1987 | |
| JP | 62275577 A * | 11/1987 | |
| JP | 62275578 A * | 11/1987 | |
| JP | 02280970 | 11/1990 | |
| JP | 03238175 | 10/1991 | |
| JP | 07276053 | 10/1995 | |
| JP | 10058145 | 3/1998 | |
| JP | 0011114672 | 4/1999 | |
| JP | 2001252781 | 9/2001 | |
| JP | 2002361473 | 12/2002 | |
| KR | 2004106838 | 12/2004 | |
| KR | 2004106839 | 12/2004 | |

* cited by examiner

METHOD OF JOINING CLAD METALS AND VESSEL PRODUCED THEREBY

FIELD OF THE INVENTION

The present invention relates to clad vessels. Embodiments of the present invention have particular application to methods to fabricate apparatus for carrying corrosive and highly pressurized fluids. Such apparatus include vessels and conduits, pipes, tanks, pressure vessels, autoclaves and heat exchangers.

BACKGROUND TO THE INVENTION

There are many applications in industry where there is a need to have pressure vessels of various types made from rare metals such as titanium, zirconium and tantalum to contain various chemicals. Since rare metals such as titanium (Ti) are very expensive and only the internal contact surfaces of the vessels need to be of such a material, a preferred approach is to use explosive-clad welded (EXW) plate or roll-clad plate. EXW plate & roll-clad plate comprises a titanium plate forced onto a base material e.g. carbon steel, resulting in a sufficiently strong bond to enable the clad plate to be shaped in the manner of a single plate.

The use of EXW or roll-clad plate is especially indicated where, if a titanium-only construction was employed, the titanium wall thickness would have to be greater than say 10 mm. In such a situation it is usually a far more economical solution to use clad plate consisting of a thin, e.g. 2 mm to 16 mm thick titanium plate as the cladding material.

For the purposes of explanation the present invention will be described with reference to clad plate comprising a layer of titanium bonded to a thicker steel layer. It will be realised that the invention encompasses methods for joining clad plate, and apparatus formed by such methods, wherein the clad plate is comprised of other combinations of metals than titanium and carbon steel.

In order to fabricate a vessel of desired shape and size from clad plate a number of pre-shaped pieces of clad plate must be joined. Thus there are various seams which need to be welded in order to join all the individual plates together. Whilst welding the base material, e.g. carbon steel, is usually straightforward, in order to do so it is necessary to firstly remove a margin of the titanium covering along the opposing edges of each of the clad metal pieces that are to be joined. A problem then arises in that subsequent to welding the base metal the titanium layer must then be repaired in order to cover the welded base metal. This problem is compounded because, due to metallurgical reasons, titanium, for example cannot be successfully welded to the base metal but rather must be welded to other titanium.

A prior art approach to joining clad metal pieces will now be described with reference to FIG. 1.

FIG. 1 is a cross section through a typical prior art join 26 between a first piece 2 and a second piece 4 of clad plate in the form of titanium clad steel. The join makes use of a batten strap technique. Initially titanium cladding is removed from the area around all edges where steel welds 6 and 8 are to be made, typically 12 mm inward from the steel weld preparation edge. The steel base metal pieces 10 and 12 are then prepared and welds 6 and 8 applied using conventional steel fabrication procedures. The join is then cleaned-up and prepared for titanium welding. In the conventional batten strap technique, a filler-metal strip 7 is inserted into the space where the titanium has been removed. The choice of filler is dependent upon fabrication preferences; commonly used materials include copper, steel, aluminium and titanium. A wider strip of titanium 16, comprising the batten strap, is then placed over the weld area. The batten strap is welded along its edges with fillet welds 18 and 20 to adjacent titanium cladding portions 11 and 13 respectively.

FIG. 2 depicts a reaction crucible formed by joining a number of pieces of clad plate together using the batten strap technique described in relation to FIG. 1. It will be noted that the batten strap joins 26A-26D protrude into the interior of the crucible. Often agitators are used to swirl the contents of vessels made from clad plate in order to enable mixing of the contents of the vessel and to encourage reaction. The contents of the vessels are often erosive to metals. A problem has been found to occur in that the batten strap joins 26A-26D have been found to be susceptible to erosion. The batten strips therefore become the first point of failure in the titanium cladding which then exposes the base material to corrosion and pressure vessel failure if undetected.

Titanium has a substantially lower coefficient of thermal expansion than the base material, which is usually of steel. As a result, since the contents of the vessel are often at high temperatures, differential expansion and contraction of the titanium and base material can occur which lowers the fatigue life of a titanium envelope of the vessel.

In light of the above, it is an object of the present invention to provide a method for joining clad metals which can be used to fabricate vessels and which addresses one or more of the above-described problems.

It is a further object of the present invention to provide a clad plate vessel that is not as susceptible to the above-described problems as has hitherto been the case. The clad plate vessel may include a titanium envelope.

SUMMARY OF THE INVENTION

According to a first aspect of the present invention there is provided a method for joining clad metal plates having a protective layer and a substrate layer, the method including:
removing margins of protective layer along edges of the clad metal plates to be joined;
welding the substrate layers together to form an exposed substrate weld;
locating covering material of the same type as the protective layer along the exposed substrate weld to a level substantially flush with an outer surface of the protective layer; and
welding the covering material to the protective layer so that the protective layer, covering material and welds located there-between from an outer layer of substantially uniform thickness.

The covering material may include one or more backing strips.

In one embodiment edges of the one or more backing strips are located between respective interfaces of the protective layer and the substrate layer adjacent the edges of the clad metal plates to be joined.

Preferably slots are formed between said respective interfaces to receive the edges of the one or more backing strips.

The covering material will generally include a batten strip.

In some embodiments the method includes locating the batten strip over the one or more backing strips.

The batten strip may be formed with sloping sides that open out towards the surface of the protective layer. In that case the step of welding the covering material includes making a number of welding runs to form a butt weld joining the batten strip to the protective layers.

Alternatively the batten strip may be formed with sides that are substantially at right angles to the one or more backing strips. In that case the step of welding the covering material to the protective layer includes high current narrow gap welding the batten strip to the protective layers.

In a further embodiment the method includes forming steps along opposing edges of the protective layers.

In that case the covering material will typically comprise a batten strip having a base portion dimensioned to be located between said steps and a body portion having lips overhanging the base portion to rest upon said steps.

The method may include the step of preheating the substrate layer to a predetermined temperature subsequent to locating the covering material and before welding the covering material to the protective layer to achieve pre-stressing of the covering material.

The method may also include the step if preheating the covering material and the protective layer to said predetermined temperature.

According to a second aspect of the invention, there is provided a method for joining clad metal plates having a protective layer and a substrate layer, the method including:

removing margins of protective layer along edges of the clad metal plates to be joined;

welding the substrate layers together to form an exposed substrate weld;

locating covering material of the same type as the protective layer along the exposed substrate weld to a level substantially flush with an outer surface of the protective layer;

preheating the substrate layer to a predetermined temperature; and welding the covering material to the protective layer to achieve pre-stressing of the covering material upon subsequent cooling.

This aspect may include the step of preheating the covering material and the protective layer to said predetermined temperature.

According to a third aspect of the present invention, there is provided a method for joining clad metal plates having a protective layer and a substrate layer, the method including:

removing margins of the protective layer along edges of the clad metal plates to be joined;

welding the substrate layers together to form an exposed substrate weld;

locating filler material along the exposed substrate weld to a level substantially flush with an outer surface of the protective layer;

preheating the substrate layer to a predetermined temperature;

locating covering material of the same type as the protective layer to cover the filler material; and welding the covering material to the protective layer to achieve pre-stressing of the covering material upon subsequent cooling.

Preferred features, embodiments and variations of the invention may be discerned from the following Detailed Description which provides sufficient information for those skilled in the art to perform the invention. The Detailed Description will make reference to a number of drawings as follows.

DETAILED DESCRIPTION OF EXEMPLARY EMBODIMENTS

A method for joining clad metal according to a first embodiment of the present invention will now be described with reference to FIGS. 3A-3F.

Figure 3A:
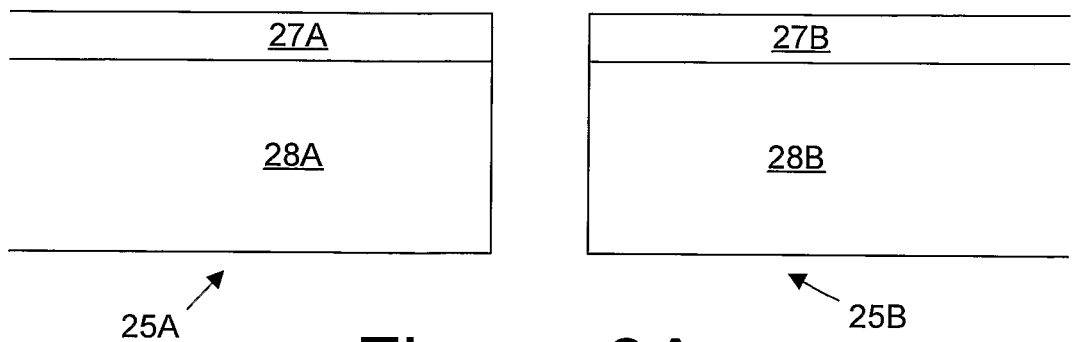
FIG. 3A depicts opposed clad metal plates to be joined according to an embodiment of the present invention.

FIG. 3A depicts cross sections of two opposing pieces of clad plate 25A and 25B to be joined. Each of the pieces consists of a substrate or base metal layer 28A, 28B, in the present example carbon steel, and a protective cladding layer 27A, 27B, in the present example titanium.

Figure 3B:
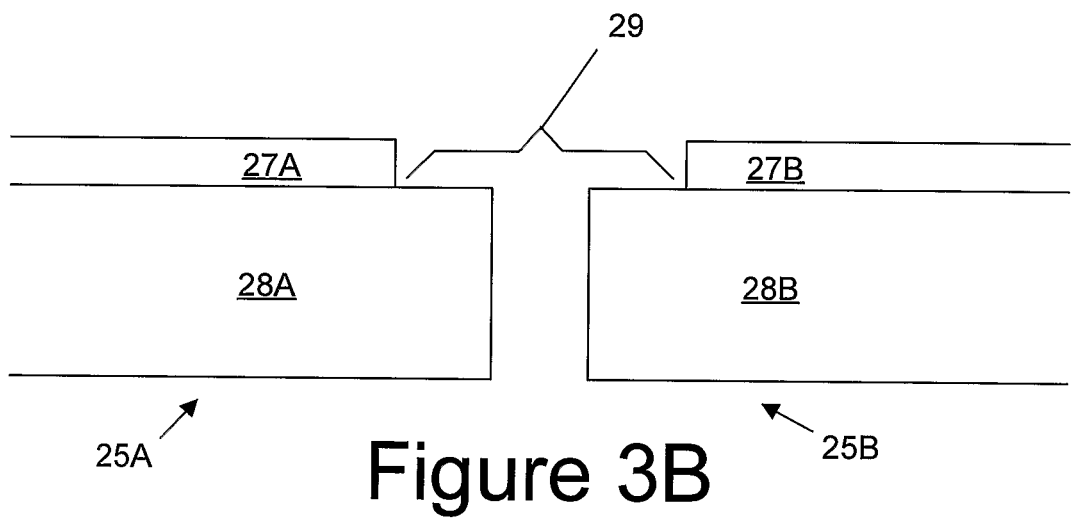
FIG. 3B depicts a step in a method according to an embodiment of the present invention.

In order to allow welding access to the base metal layers 28A and 28B, a margin 29 of titanium is stripped off along each of the opposing edges as shown in FIG. 3B.

Figure 3C:
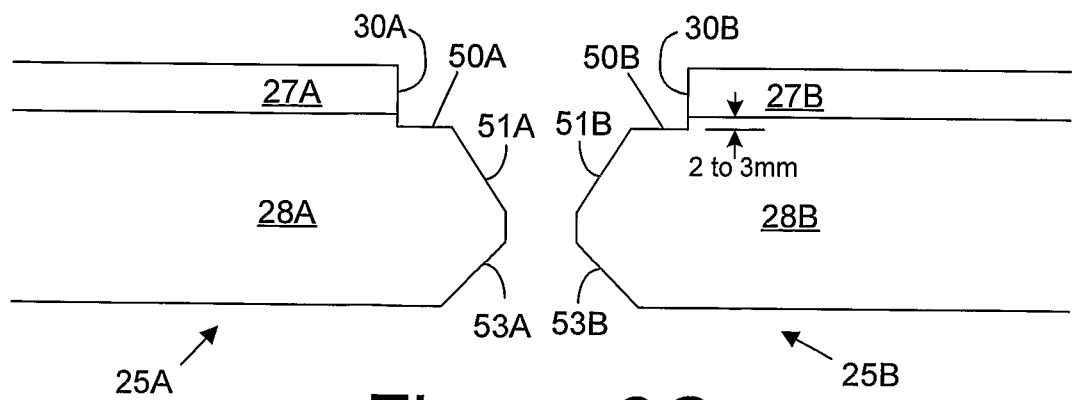
FIG. 3C depicts a further step in a method according to an embodiment of the present invention.

Metal is removed from base metal layers 28A and 28B as shown in FIG. 3C to form surfaces 50A and 50B which are typically formed at a depth of 2 mm to 3 mm below the interface between cladding portions 27A, 27B and base portions 28A, 28B respectively. At the same time base material weld preparations are cut or machined into base metal layers 28A and 28B to form opposing angled surfaces 51A, 51B and 53A, 53B.

Figure 3D:
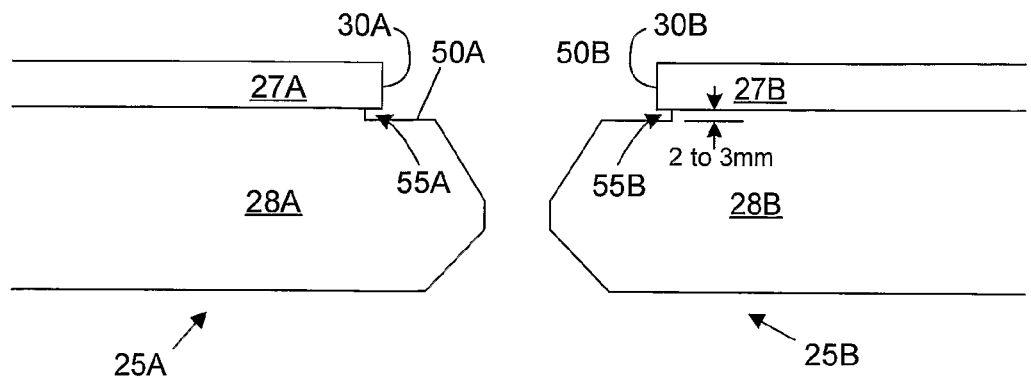
FIG. 3D depicts a further step in a method according to an embodiment of the present invention.

A machining operation is then performed to produce grooves 55A, 55B below the lower titanium cladding edges 30A and 30B as shown in FIG. 3D. Formation of the grooves may alternatively be performed subsequent to joining the base material portions 28A and 28B as will be described shortly.

Figure 3E:
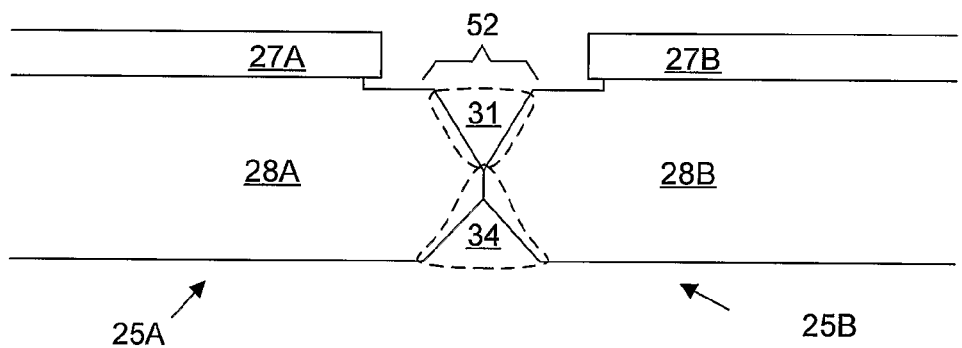
FIG. 3E depicts a further step in a method according to an embodiment of the present invention.

FIG. 3E depicts the base metal layers 28A and 28B subsequently joined using conventional steel welding techniques. This involves preparing the opposing edges of the base metal and usually firstly making an inner weld 31. The root of the inner weld is then back-gouged from the outer side i.e. the underside as it appears in FIG. 3E, and a second weld 34 is formed to complete the join between base metal portion 28A and base metal portion 28B. The inner weld surface may be machined or dressed flush to ensure a flat inside surface 52.

Figure 3F:
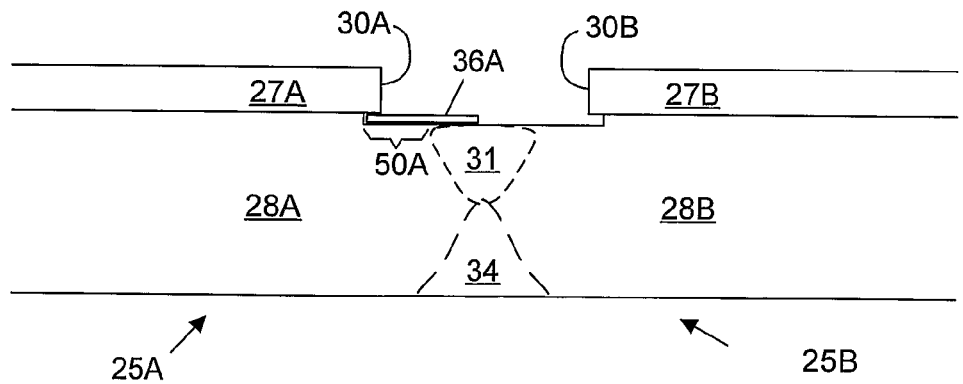
FIG. 3F depicts a further step in a method according to an embodiment of the present invention.

At FIG. 3F covering material in the form of a titanium backing strip 36A is placed over and to one side of weld 31 and the edge 50A of the base material. Backing strip 36A is then pushed under the cladding edge 30A by means of light mallets to bring it to a final position as shown in FIG. 3F.

Figure 3G:
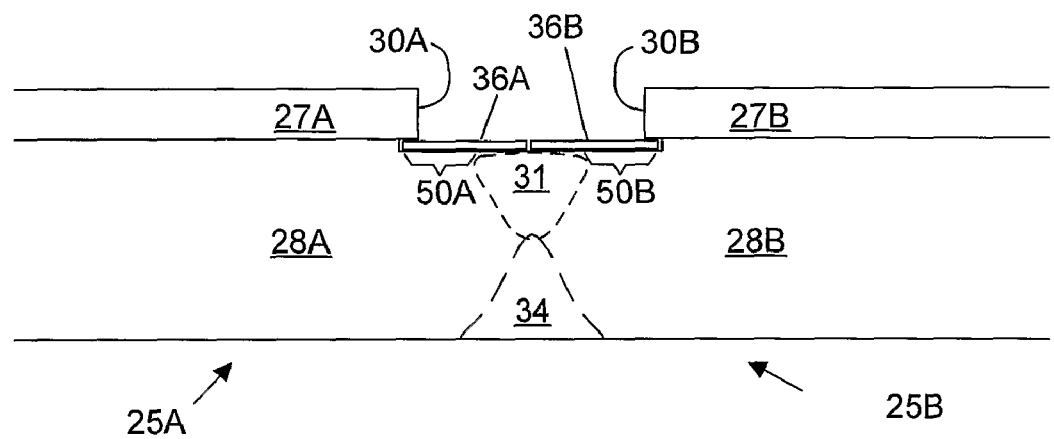
FIG. 3G depicts a further step in a method according to an embodiment of the present invention.

Backing strip 36B is then placed on weld 31 and base material edge 50B. Backing strip 36B is then pushed under the cladding edge 27B by means of light mallets to bring it to a final position as shown in FIG. 3G.

Figure 3H:
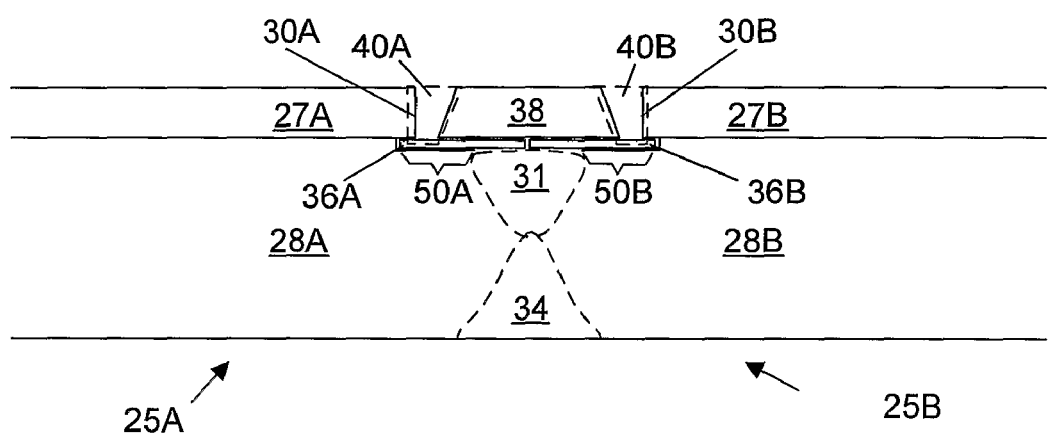
FIG. 3H depicts a further step in a method according to an embodiment of the present invention.

Further covering material in the form of a titanium batten strip 38 is then located over backing strips 36A and 36B as shown in FIG. 3H. The edges of batten strip 38, and opposing edges 30A, 30B of the titanium cladding layers 27A, 27B have previously been prepared for titanium welding. Multiple run titanium welds 40A and 40B are then formed using conventional methods. It will be noted that welds 40A and 40B are each three-way welds in that they join the batten strip both to the adjacent cladding layer and also to the underlying backing strips 36A and 36B. It will be further noted that because batten strip 38 is the same thickness as the adjacent cladding layers, and because the upper surface of the backing strip is substantially flush with the lower surface of the cladding layers 27A, 27B, the batten strip does not protrude substantially above the adjacent cladding layers. Consequently, a vessel formed according to the previously described embodiment does not have protruding joins which are susceptible to erosion. A further advantage is that the welds 40A and 40B are strong due to the fact that they run the full thickness of the cladding layer and are a butt-type weld in contrast to the fillet welds 18 and 20 of the prior art embodiment of FIG. 1.

Figure 4A:
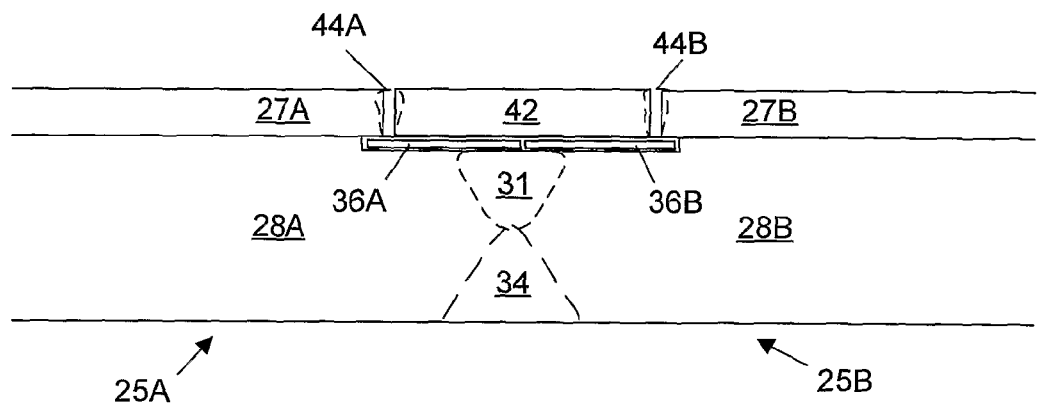
FIG. 4A depicts a join produced by a method according to second embodiment of the present invention.
Figure 4B:
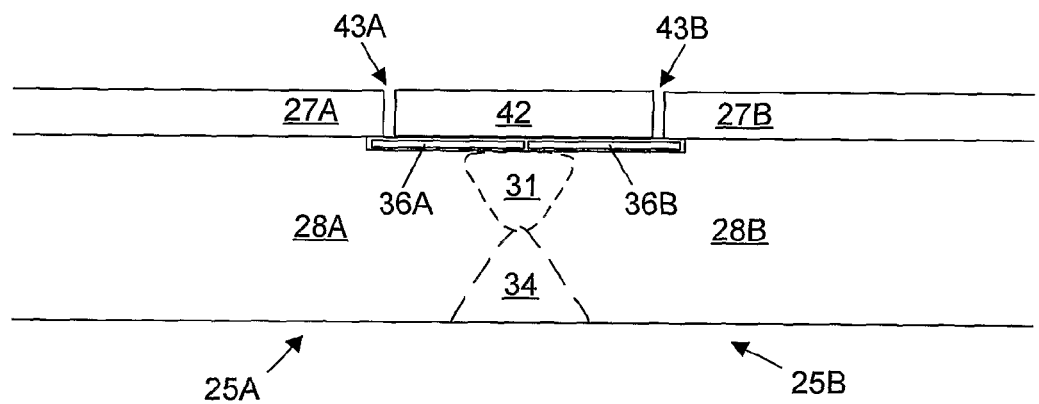
FIG. 4B depicts a step in the production of the join of FIG. 4A.

Referring now to FIG. 4A, a join between two pieces of clad metal is depicted that is formed by a method according to a further embodiment of the present invention. The join shown in FIG. 4A is formed using the steps that were previously described in relation to FIGS. 3A-3G. Subsequent to the step described with reference to FIG. 3G covering material in the form of a precisely dimensioned batten strip 42 is located over backing strips 36A and 36B as shown in FIG. 4A. This is so that the gaps 43A, 43B between the batten strip and adjacent cladding layers 27A and 27B are about 1 mm in width. High current narrow gap welds 44A, 44B, or as they are sometimes called, "keyhole welds" are then formed to join the batten strip to the adjacent cladding layers 27A, 27B and to the underlying backing strips as shown in FIG. 4A. An advantage of the embodiment used to form the weld depicted in FIG. 4A is that it reduces residual stresses in the batten strip joint and it is not necessary to prepare the edges of batten strip 42 and adjacent titanium cladding layers 27A and 27B prior to making each of the keyhole welds. Furthermore, multiple welding runs are not necessary.

The join of FIG. 4A is relatively smooth so that a vessel formed according to this embodiment does not have protruding joins that are susceptible to erosion.

Figure 5A:
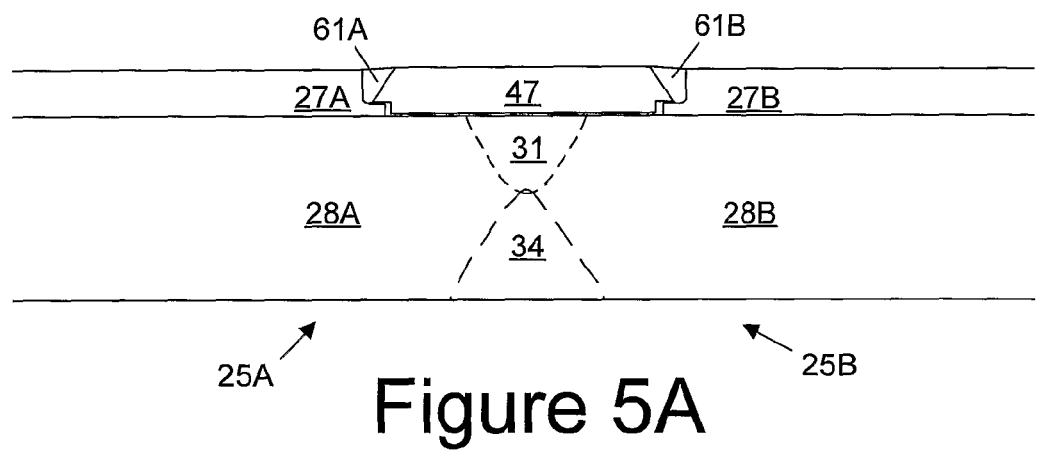
FIG. 5A depicts a join produced by a method according to a third embodiment of the present invention.
Figure 5B:
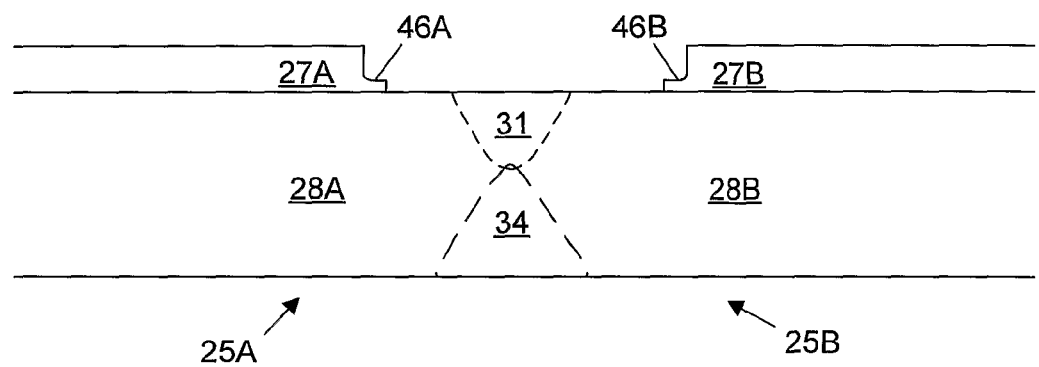
FIG. 5B depicts a step in the production of the join of FIG. 5A.
Figure 5C:
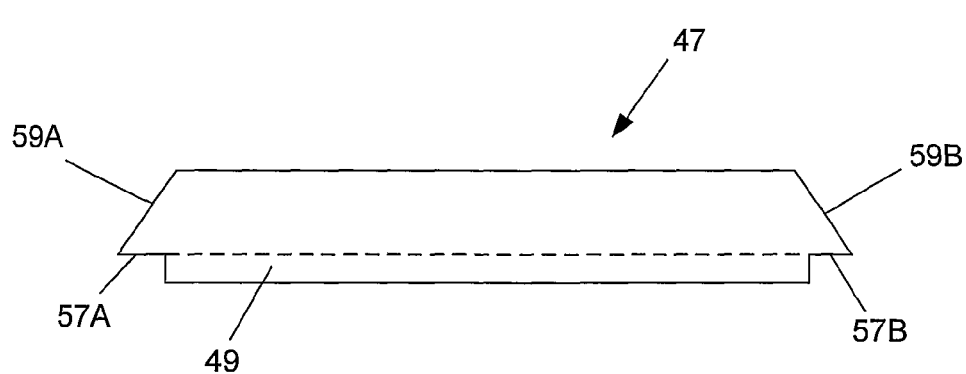
FIG. 5C depicts covering material in the form of a batten strip used to form the join in FIG. 5A.

Referring now to FIG. 5A, there is depicted a clad metal join formed by a method according to a further embodiment of the present invention. The clad metal join of FIG. 5A is formed by initially performing the steps described in relation to FIGS. 3A to 3C, though without machining surfaces 50A and 50B in FIG. 3C. The opposing edges of clad layers 27A and 27B are then machined to produce opposing steps 46A and 46B as shown in FIG. 5B. A batten strip 47 of the same material as the cladding 27A, 27B, e.g. titanium is machined so that it is stepped with a base portion 49 that locates between steps 46A and 46B and overhanging lips 57A and 57B that rest on steps 46A and 46B respectively. The batten strip 47 is formed with sloping sides 59A and 59B that provide space for titanium welding runs 61A and 61B to be formed between the batten strip and the opposing edges 30A and 30B of cladding 27A, 27B.

Figure 6:
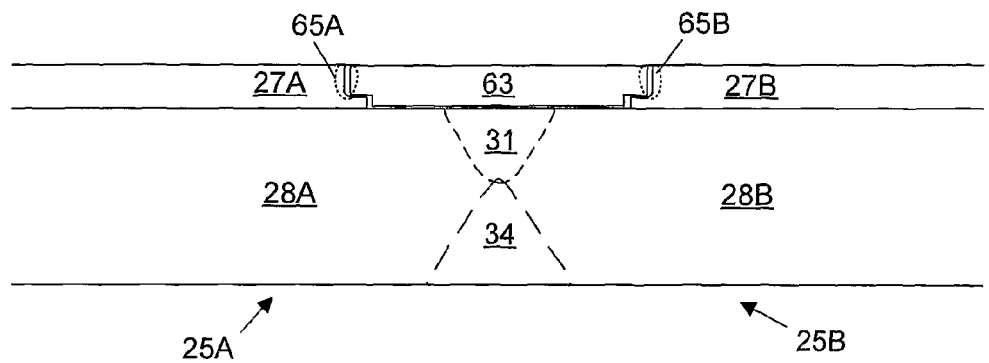
FIG. 6 depicts a join produced by a method according to a fourth embodiment of the present invention.

FIG. 6 depicts a variation to the join depicted in FIG. 5A wherein batten strip 63 has vertical sides and is precisely shaped to fit snugly between the opposing edges of cladding 27A and 27B with a gap on either side of about 1 mm. High current, narrow gap welds 65A and 65B are then performed to join batten 63 to cladding 27A and 27B.

Figure 8:
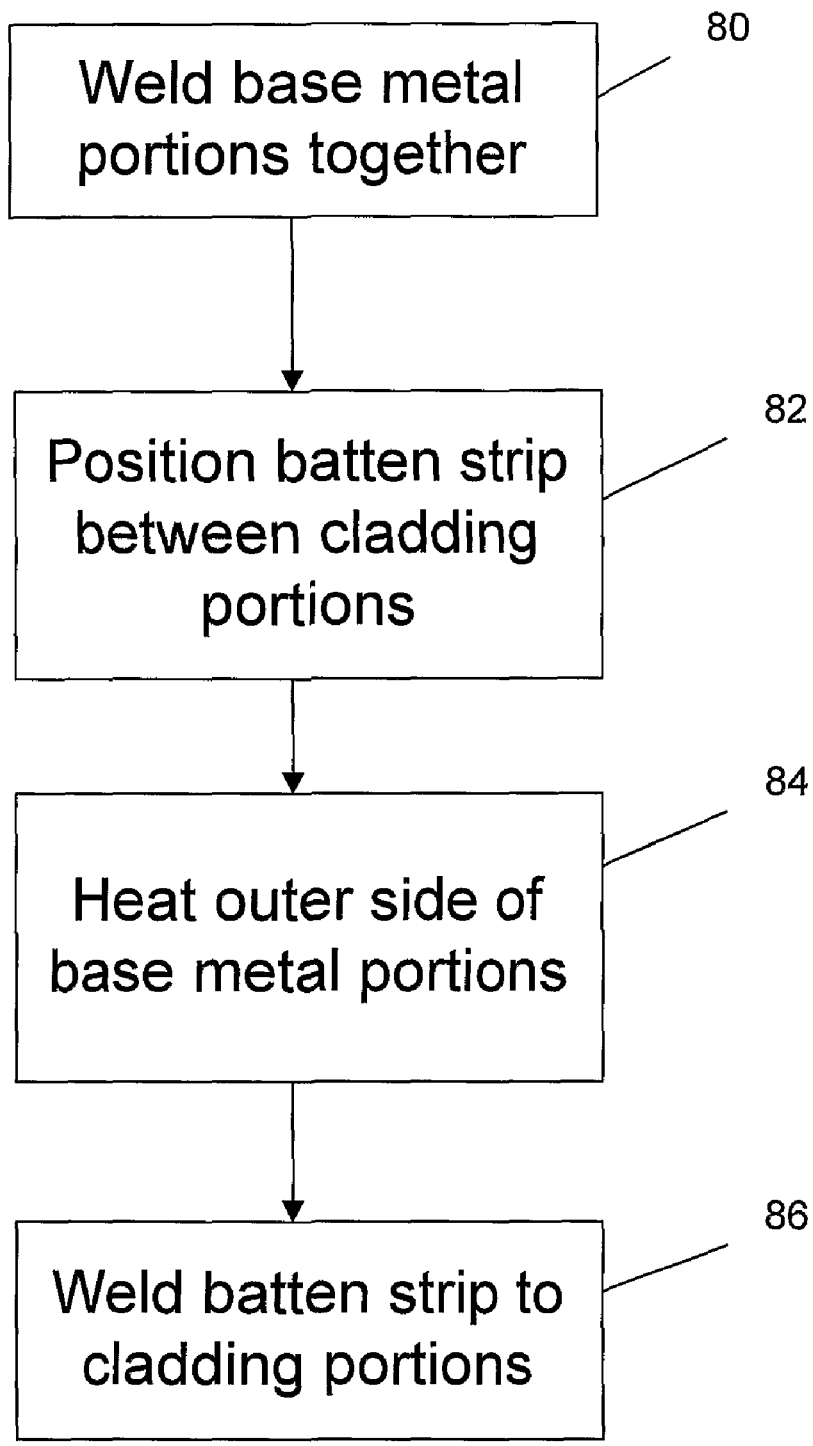
FIG. 8 depicts a flowchart showing the steps for joining clad metal plates together according to an embodiment of the invention.

In order to address problems associated with differential thermal expansion of the base metal portions 28A, 28B and batten strip 38, 42, 47 or 63, the following steps (shown in FIG. 8) are added to any of the methods described in relation to FIGS. 3A to 6.

After the base metal portions 28A, 28B have been welded together at step 80 and the batten strip 38, 42, 47 or 63 has been positioned between the cladding portions 27A, 27B at step 82, but not yet welded, an outer side of the base metal portions 28A, 28B is heated at step 84. The heating is carried out until a suitable titanium pre-weld temperature is reached on the inside surface of the titanium. The temperature is selected to suit the particular application and is over 50° C. The batten strip 38, 42, 47 or 63 is then welded at step 86 as described above.

As a result of this process, when the crucible cools, the batten strip 38, 42, 47 or 63 is placed in compression, since carbon steel has a higher coefficient of thermal expansion than titanium. This improves the fatigue life of the crucible.

Figure 1:
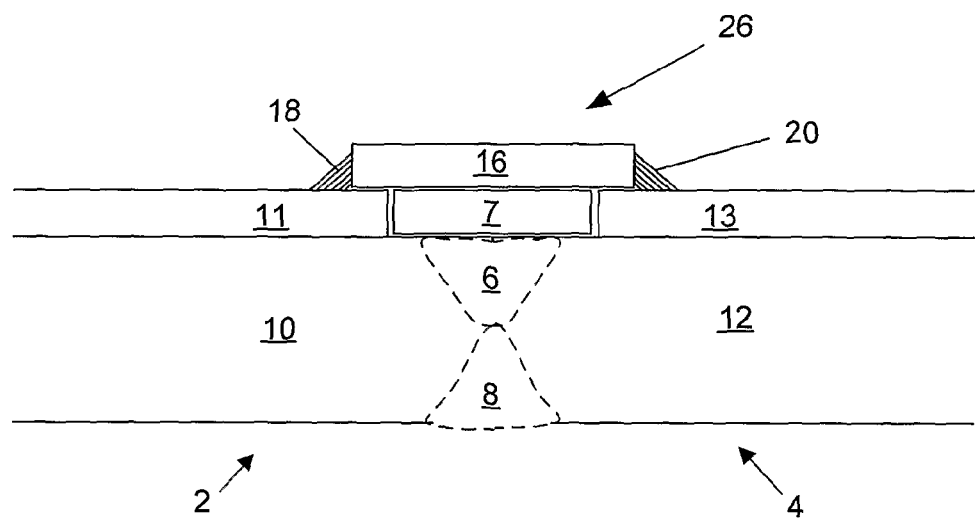
FIG. 1 is a cross section through a prior art clad metal plate join.
Figure 2:
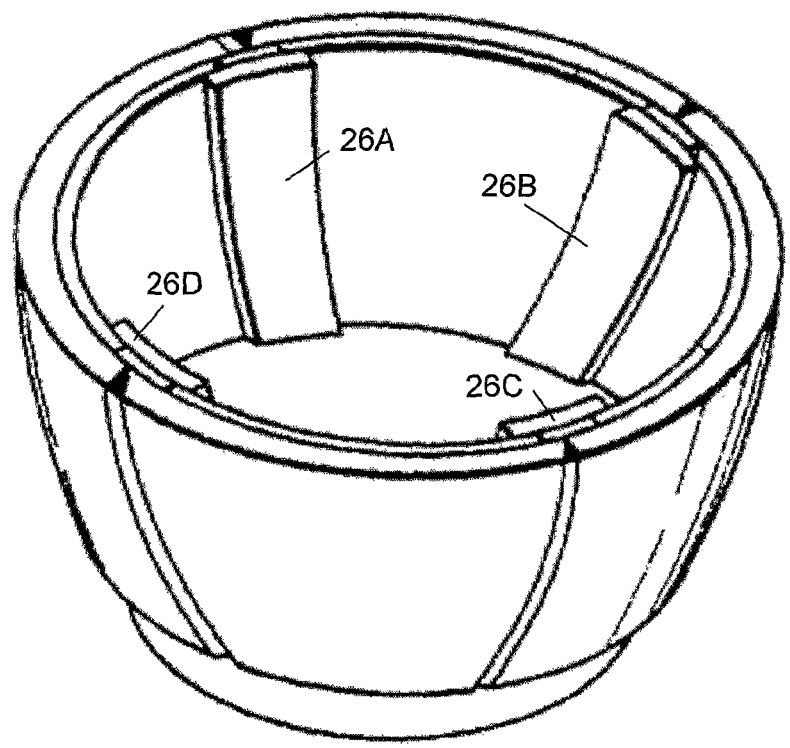
FIG. 2 is a cross section of a prior art vessel formed with joins of the type depicted in FIG. 1.

An analogous process can also be applied to join clad metal plates as shown in FIG. 1. Initially, the method involves removing margins of the protective layer 11, 13 along edges of the clad metal plates to be joined and welding the substrate layers 10, 12 together to form an exposed substrate weld 6. Filler material 7 is then located along the exposed substrate weld 6 to a level substantially flush with an outer surface of the protective layer 11, 13. The method further involves preheating the substrate layer 10, 12 to a predetermined temperature and locating covering material 16, of the same type as the protective layer 11, 13, to cover the filler material 7. Finally, the covering material 16 is welded to the protective layer to achieve pre-stressing of the covering material 16 upon subsequent cooling.

Figure 7:
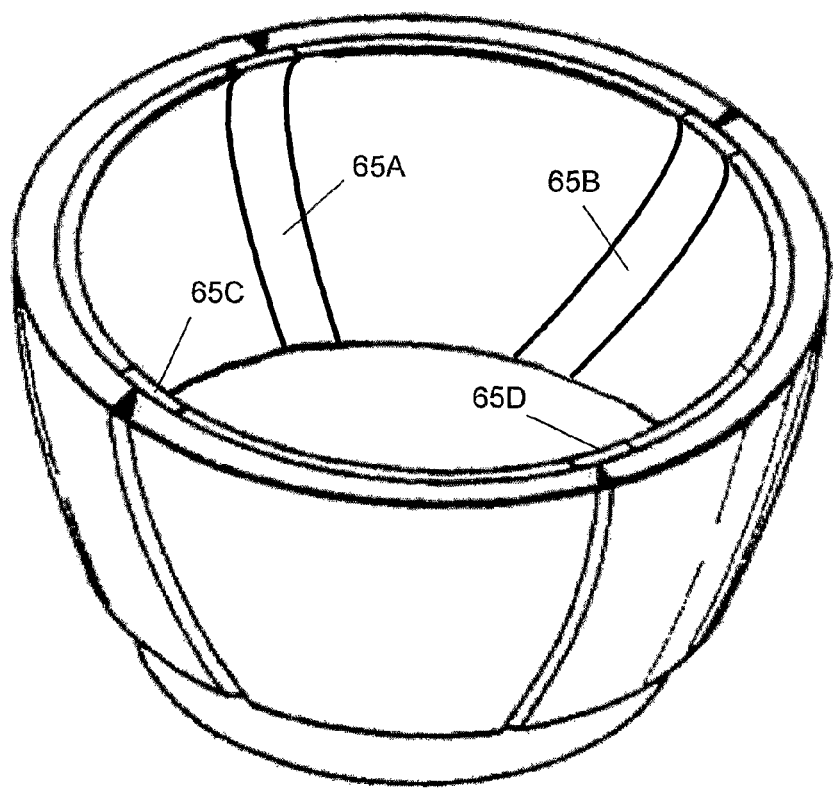
FIG. 7 depicts a vessel according to an embodiment of the present invention.

FIG. 7 depicts an apparatus in the form of a crucible formed from clad plate using one or more of the joining methods described herein. It will be noted that seams 65A-65D do not protrude into the crucible so that they are considerably less susceptible to erosion than was the case for the prior art crucible of FIG. 1.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A method for joining clad metal plates having a protective layer and a substrate layer, the method including:
   removing margins of protective layer along edges of the clad metal plates to be joined;
   welding the substrate layers together to form an exposed substrate weld;
   locating backing material along the exposed substrate weld;

locating covering material of the same type as the protective layer along the backing material to a level substantially flush with an outer surface of the protective layer; and welding the covering material to the protective layer so that the protective layer, covering material and welds located there-between form an outer layer of substantially uniform thickness, the welds also joined to the backing material.

2. A method according to claim 1, wherein the backing material includes one or more titanium backing strips.

3. A method according to claim 2, wherein the one or more backing strips includes no more than two backing strips, the edges of the one or more backing strips being located between respective interfaces of the protective layer and the substrate layer adjacent the edges of the clad metal plates to be joined.

4. A method according to claim 3, including forming slots between said respective interfaces to receive the edges of the one or more backing strips.

5. A method according to claim 4, wherein the covering material includes a batten strip.

6. A method according to claim 5, including locating the batten strip over the one or more backing strips.

7. A method according to claim 6, wherein the batten strip is formed with sloping sides that open out towards the outer surface of the protective layer.

8. A method according to claim 6, wherein the batten strip is formed with sides that are substantially at right angles to the one or more backing strips.

9. A method according to claim 8, wherein the step of welding the covering material to the protective layer includes welding the batten strip to the protective layers.

10. A method according to claim 7, wherein the step of welding the covering material includes making a number of welding runs to form a butt weld joining the batten strip to the protective layers.

11. A method according to claim 1, including forming steps along the opposing edges of the protective layers.

12. A method according to claim 11, wherein the covering material comprises a batten strip having a base portion dimensioned to located between said steps and a body portion having lips overhanging the base portion to rest upon said steps.

13. A method as claimed in claim 1, which includes the step of preheating the substrate layer to a predetermined temperature subsequent to locating the covering material and before welding the covering material to the protective layer to achieve pre-stressing of the covering material.

14. A method as claimed in claim 13 which includes the step of preheating the covering material and the protective layer to said predetermined temperature.

* * * * *